United States Patent
Ikeguchi

(10) Patent No.: US 7,158,190 B2
(45) Date of Patent: Jan. 2, 2007

(54) BROADCASTING RECEIVER AND CHANNEL SEARCHING METHOD IN BROADCASTING RECEIVER

(75) Inventor: Yasuyuki Ikeguchi, Itami (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 512 days.

(21) Appl. No.: 10/656,247

(22) Filed: Sep. 8, 2003

(65) Prior Publication Data

US 2004/0051816 A1    Mar. 18, 2004

(30) Foreign Application Priority Data

Sep. 13, 2002   (JP) .............................. 2002-268663

(51) Int. Cl.
*H04N 5/50*   (2006.01)
(52) U.S. Cl. ...................................... 348/731; 348/732
(58) Field of Classification Search ........ 348/731–733, 348/554, 725, 555, 553; 725/38
See application file for complete search history.

(56) References Cited

U.S. PATENT DOCUMENTS 6,137,546 A * 10/2000 Shintani et al. ............. 348/731
6,188,448 B1 * 2/2001 Pauley et al. ................ 348/731
6,924,848 B1 * 8/2005 Onomatsu .................... 348/732

FOREIGN PATENT DOCUMENTS

| JP | 10-150346 | 6/1998 |
| JP | 2001-230689 | 8/2001 |
| JP | 2002-353780 | 12/2002 |

OTHER PUBLICATIONS

Office Action from the Japanese Patent Office dated Jul. 5, 2005 in corresponding Japanese patent application.

* cited by examiner

*Primary Examiner*—Michael H. Lee
(74) *Attorney, Agent, or Firm*—Westerman, Hattori, Daniels & Adrian, LLP.

(57) ABSTRACT

Each of channel searching means comprises means for judging, when a search for the subsequent channel is started, whether or not receivable channel information or information indicating that receiving is impossible is stored in a channel map with respect to the subsequent channel, means for starting the search for the subsequent channel when the receivable channel information or the information indicating that receiving is impossible is not stored in the channel map with respect to the subsequent channel, and means for terminating the channel search when the receivable channel information or the information indicating that receiving is impossible is stored in the channel map with respect to the subsequent channel.

6 Claims, 3 Drawing Sheets

BROADCASTING RECEIVER AND CHANNEL SEARCHING METHOD IN BROADCASTING RECEIVER

BACKGROUND OF THE INVENTION

1. Field of the Invention

The present invention relates to a broadcasting receiver and a channel searching method in the broadcasting receiver, and more particularly, to a broadcasting receiver having two digital receiving units and a channel searching method in the broadcasting receiver having the two digital receiving units.

2. Description of the Prior Art

In recent years, ground wave digital television broadcasting has been developed. The transition from current analog broadcasting to digital broadcasting is being made. In a period of the transition, it has been expected that a channel map is frequently changed by newly opening a digital broadcasting station and changing frequencies, for example. Therefore, a receiver is required to make an efficient channel search.

On the other hand, smooth channel selection can be carried out by previously recognizing on which channel (frequency) broadcasting is being performed in the case of receiving, that is, on which channel broadcasting is receivable. Channels on which broadcasting is being performed differ for each area. Therefore, a channel map is produced by making a search over all broadcasting channels to determine on which channel broadcasting is being performed when a receiver is installed.

The channel search is made by tuning in to channels in a predetermined order with respect to a tuner and judging whether or not broadcasting is being performed on the channel based on whether or not a normal signal to be received can be obtained from the tuner.

Description is now made of an example of the channel searching operation of the receiver using FIG. 1.

FIG. 1 illustrates the configuration of a broadcasting receiver.

The broadcasting receiver comprises two groups of digital receiving units for receiving ground wave digital broadcasting. One of the digital receiving units comprises a first digital tuner 101, a first digital demodulator 102, and a first TS decoder 103. The other digital receiving unit comprises a second digital tuner 201, a second digital demodulator 202, and a second TS decoder 203.

A microcomputer 300 receives, through a remote control signal receiver 301 for receiving an operation signal transmitted by radio from a remote control 401 or a main body operation key 302, the operation signal. The microcomputer 300 starts a channel searching operation by receiving an operation signal representing a channel search command.

The channel search has been conventionally made using the one digital receiving unit. That is, the microcomputer 300 outputs to the first digital tuner 101 a channel selection instruction for tuning in to a channel having the lowest frequency on which broadcasting may be performed when it receives the operation signal representing the channel search command. Out of signals inputted to the digital tuner 101 from the ground wave broadcasting antenna 100, the signal selected by the digital tuner 101 is inputted to the first digital demodulator 102, and is subjected to demodulation processing conforming to a modulation system. Generally, a digital TV broadcasting signal is subjected to OFDM (Orthogonal Frequency Demodulation Multiplexing) modulation, for example, and is subjected to OFDM demodulation by the first digital demodulator 102.

If a normal signal is broadcast, it is outputted as an MPEG (Motion Picture Expert Group) transport stream after being previously subjected to processing for error correction. The demodulated MPEG transport stream is subjected to decoding processing by the first TS decoder 103, and is outputted as elementary streams such as a video, an audio, etc., so that a video signal and an audio signal are restored by a video/audio decoder 104.

The microcomputer 300 judges whether or not a normal digital signal is received on the channel which the digital tuner 101 is instructed to tune in to on the basis of the state of the first digital demodulator 102. Specifically, it is judged whether or not the normal digital signal is broadcast depending on whether or not the first digital demodulator 102 can establish synchronization of the received digital signal. However, a method of judging whether or not the normal digital signal is received is not necessarily limited to the same.

Information such as a broadcasting station name sent from a broadcasting station is acquired on the basis of data obtained by the first TS decoder 103. The presence or absence of broadcasting may be judged depending on whether or not the broadcasting station name can be specified. When it is judged that the normal digital signal is received, the microcomputer 300 stores in a memory 303 information for channel selection (receivable channel information) such as a frequency, a broadcasting station name, and a channel number.

The microcomputer 300 then outputs an instruction to tune in to a channel on the high frequency side adjacent to the current channel, for example. The microcomputer 300 judges whether or not the normal digital signal is received on the channel tuned in to in the same manner as described above, and stores in the memory 303 information for channel selection (receivable channel information) such as a frequency, a broadcasting station name, and a channel number when it is judged that the normal digital signal is received. Such an operation is repeated over all channels, to store in the memory 303 receivable channel information indicating on which channel broadcasting is being performed.

At the time of a normal operation, the microcomputer 300 receives a channel selection instruction from a user through the remote control signal receiver 301 or the main body operation key 302, and refers to data in the memory 303, thereby outputting to the first digital tuner 101 a channel selection instruction corresponding to the channel desired by the user.

As described in the foregoing, in the channel search for digital broadcasting, it is judged whether or not a normal signal can be received, and it is necessary to confirm the contents of digital data in order to extract a broadcasting station name or the like. Therefore, it generally takes much time to judge whether or not broadcasting is being performed on the channel.

Furthermore, in Japanese ground wave digital broadcasting, there are a plurality of types of broadcasting modes, and all combinations of the modes must be tried. Therefore, it takes more time to make the judgment. Thus, the channel search for digital broadcasting requires more time than the channel search for conventional analog broadcasting. When a channel search must be frequently made as in a period of transition to digital broadcasting, a viewer is forced to feel inconvenience.

An example of a VTR-integrated receiver is one comprising two groups of digital receiving units, as shown in FIG. 1. In such a receiver, it is considered that a channel search is made using the two digital receiving units. That is, channels to be searched for are previously divided into two groups, to search for each of the channels in the one group using the one digital receiving unit, while searching for each of the channels in the other group using the other digital receiving unit.

When a channel search is made by such a method, a processing time period can be made shorter, as compared with that in a case where a channel search is made using only one digital receiving unit. Even in the search for one channel, however, a search time period differs depending on whether or not there is broadcasting. When the number of channels handled by each of the digital receiving units is fixedly assigned, as described above, it takes longer to make the channel search using the one digital receiving unit than the channel search using the other digital receiving unit.

SUMMARY OF THE INVENTION

An object of the present invention is to provide a broadcasting receiver capable of efficiently making a channel search and a channel searching method in the broadcasting receiver.

In a broadcasting receiver comprising a broadcasting receiving unit for receiving a television broadcasting signal, and a memory for storing a channel map storing for each of broadcasting channels receivable channel information or information indicating that receiving is impossible, the broadcasting receiving unit comprising a first digital receiving unit and a second digital receiving unit, a broadcasting receiver according to the present invention is characterized by comprising first channel searching means for tuning in to the broadcasting channels in a predetermined order using the first digital receiving unit, judging for each of the broadcasting channels whether or not broadcasting is receivable, and storing, with respect to the broadcasting channel on which broadcasting is receivable, the receivable channel information in the channel map, while storing, with respect to the broadcasting channel on which broadcasting is not receivable, the information indicating that receiving is impossible; and second channel searching means for tuning in to the broadcasting channels in an order opposite to the first channel searching means using the second digital receiving unit, judging for each of the broadcasting channels whether or not broadcasting is receivable, and storing, with respect to the broadcasting channel on which broadcasting is receivable, the receivable channel information in the channel map, while storing, with respect to the broadcasting channel on which broadcasting is not receivable, the information indicating that receiving is impossible, each of the channel searching means comprising means for judging, when a search for the subsequent channel is started, whether or not the receivable channel information or the information indicating that receiving is impossible is stored in the channel map with respect to the subsequent channel, means for starting the search for the subsequent channel when the receivable channel information or the information indicating that receiving is impossible is not stored in the channel map with respect to the subsequent channel, and means for terminating the channel search when the receivable channel information or the information indicating that receiving is impossible is stored in the channel map with respect to the subsequent channel.

The first channel searching means searches for the channels in ascending order of their frequencies, for example, and the second channel searching means searches for the channels in descending order of their frequencies, for example.

Each of the digital receiving units comprises a digital tuner for selecting a channel to be received, and a digital demodulator for demodulating a signal on the selected channel, and each of the channel searching means judges whether or not digital broadcasting is receivable on the channel to be received currently selected depending on whether or not the digital demodulator can establish synchronization of a received signal.

In a channel searching method in a broadcasting receiver comprising a broadcasting receiving unit for receiving a television broadcasting signal, and a memory for storing a channel map storing for each of broadcasting channels receivable channel information or information indicating that receiving is impossible, the broadcasting receiving unit comprising a first digital receiving unit and a second digital receiving unit, a channel searching method in a broadcasting receiver according to the present invention is characterized by comprising a first channel searching step for tuning in to the broadcasting channels in a predetermined order using the first digital receiving unit, judging for each of the broadcasting channels whether or not broadcasting is receivable, and storing, with respect to the broadcasting channel on which broadcasting is receivable, the receivable channel information in the channel map, while storing, with respect to the broadcasting channel on which broadcasting is not receivable, the information indicating that receiving is impossible, and second channel searching step for tuning in to the broadcasting channels in an order opposite to the first channel searching step using the second digital receiving unit, judging for each of the broadcasting channels whether or not broadcasting is receivable, and storing, with respect to the broadcasting channel on which broadcasting is receivable, the receivable channel information in the channel map, while storing, with respect to the broadcasting channel on which broadcasting is not receivable, the information indicating that receiving is impossible, each of the channel searching steps comprising the steps of judging, when a search for the subsequent channel is started, whether or not the receivable channel information or the information indicating that receiving is impossible is stored in the channel map with respect to the subsequent channel, starting the search for the subsequent channel when the receivable channel information or the information indicating that receiving is impossible is not stored in the channel map with respect to the subsequent channel, and terminating the channel search when the receivable channel information or the information indicating that receiving is impossible is stored in the channel map with respect to the subsequent channel.

The first channel searching step comprises the step of searching for the channels in ascending order of their frequencies, for example, and the second channel searching step comprises the step of searching for the channels in descending order of their frequencies, for example.

Each of the digital receiving units comprises a digital tuner for selecting a channel to be received, and a digital demodulator for demodulating a signal on the selected channel, and each of the channel searching steps comprises the step of judging whether or not digital broadcasting is receivable on the channel to be received currently selected depending on whether or not the digital demodulator can establish synchronization of a received signal.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
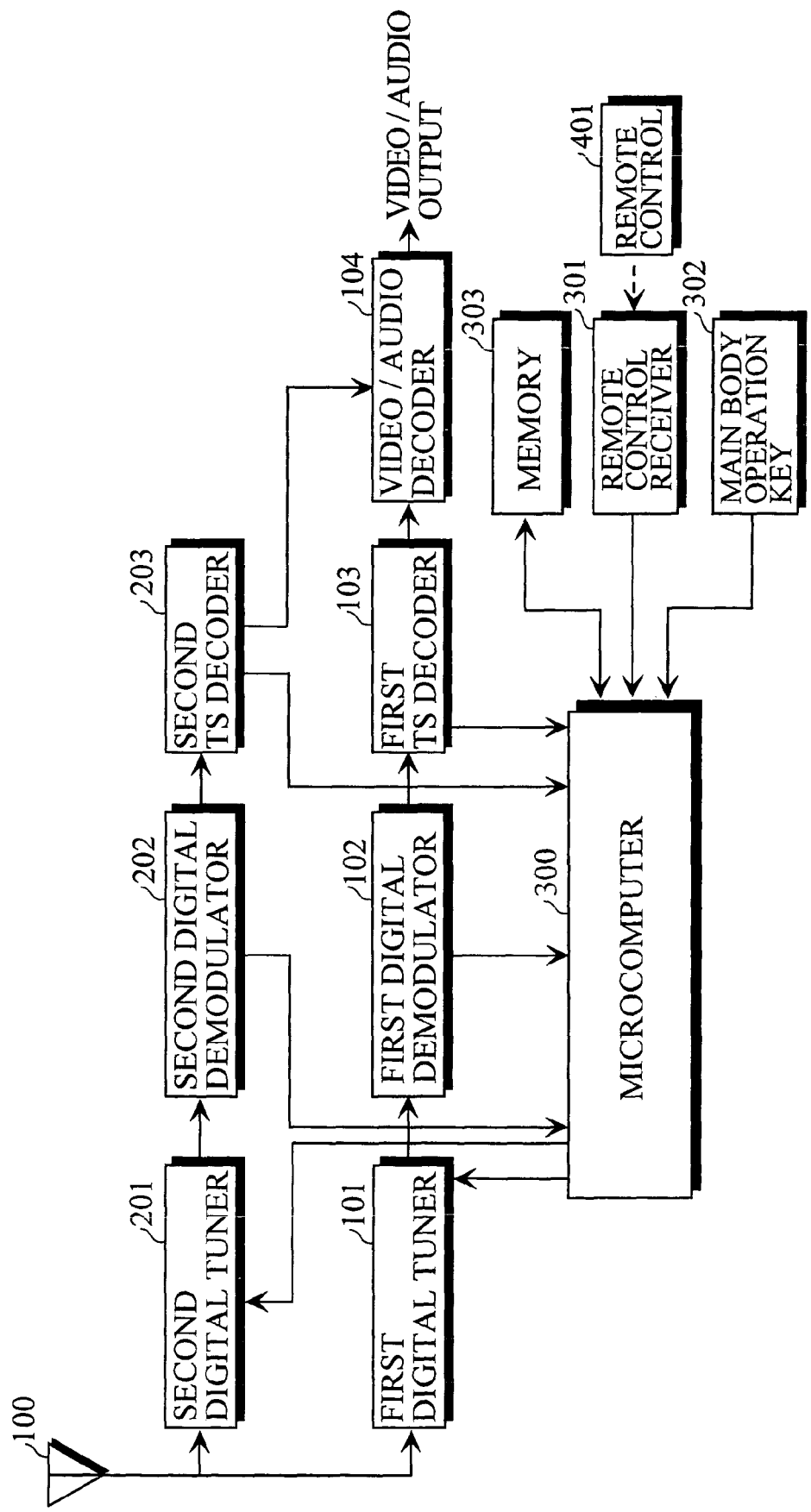
FIG. 1 is a block diagram showing the configuration of a broadcasting receiver.

Referring now to the drawings, an embodiment of the present invention will be described.

Also in the present embodiment, the configuration of a broadcasting receiver (a hardware configuration) is also the same as the configuration of the conventional broadcasting receiver shown in FIG. 1.

Figure 2:
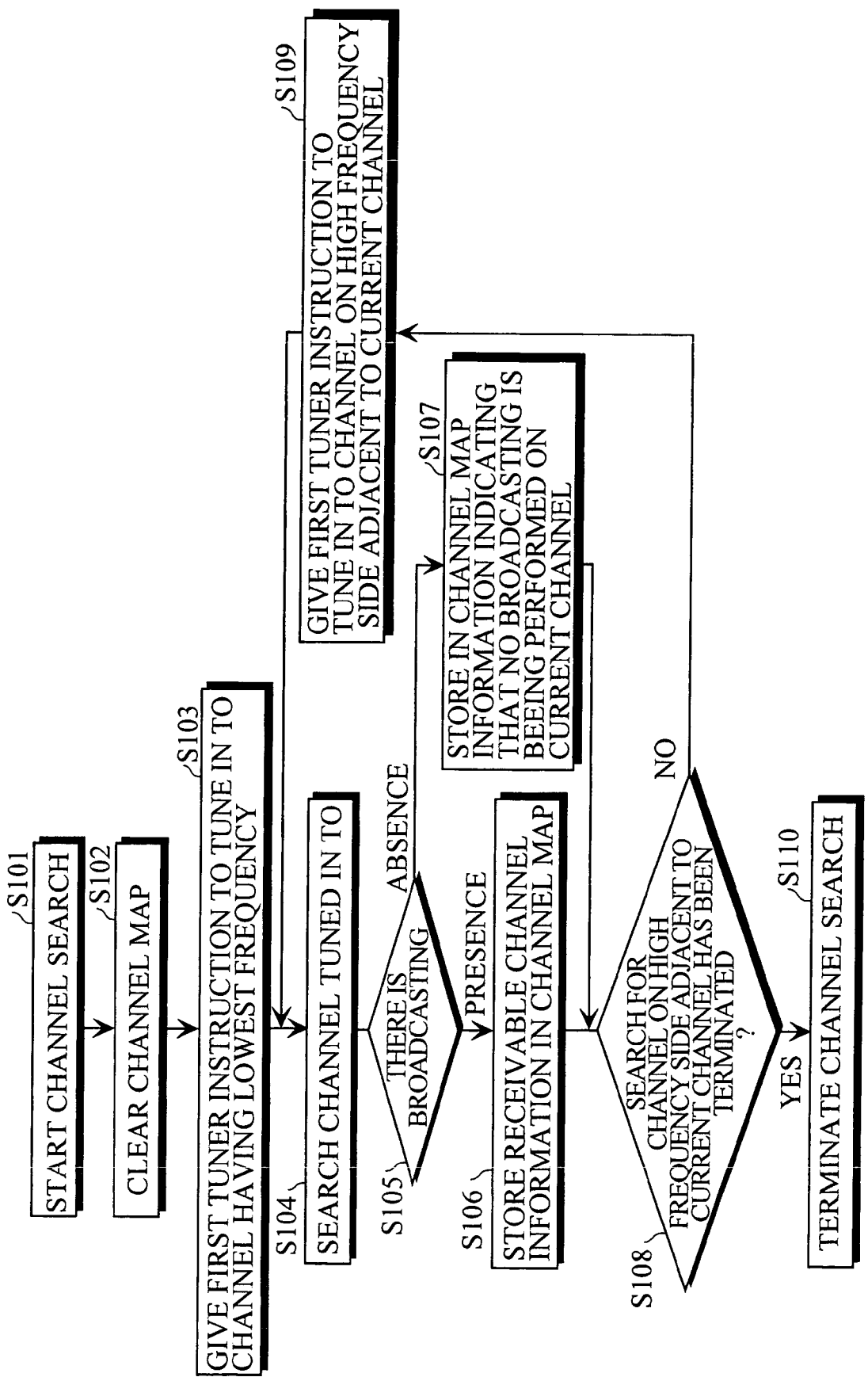
FIG. 2 is a flow chart showing the procedure for channel searching processing using a first digital receiving unit.
Figure 3:
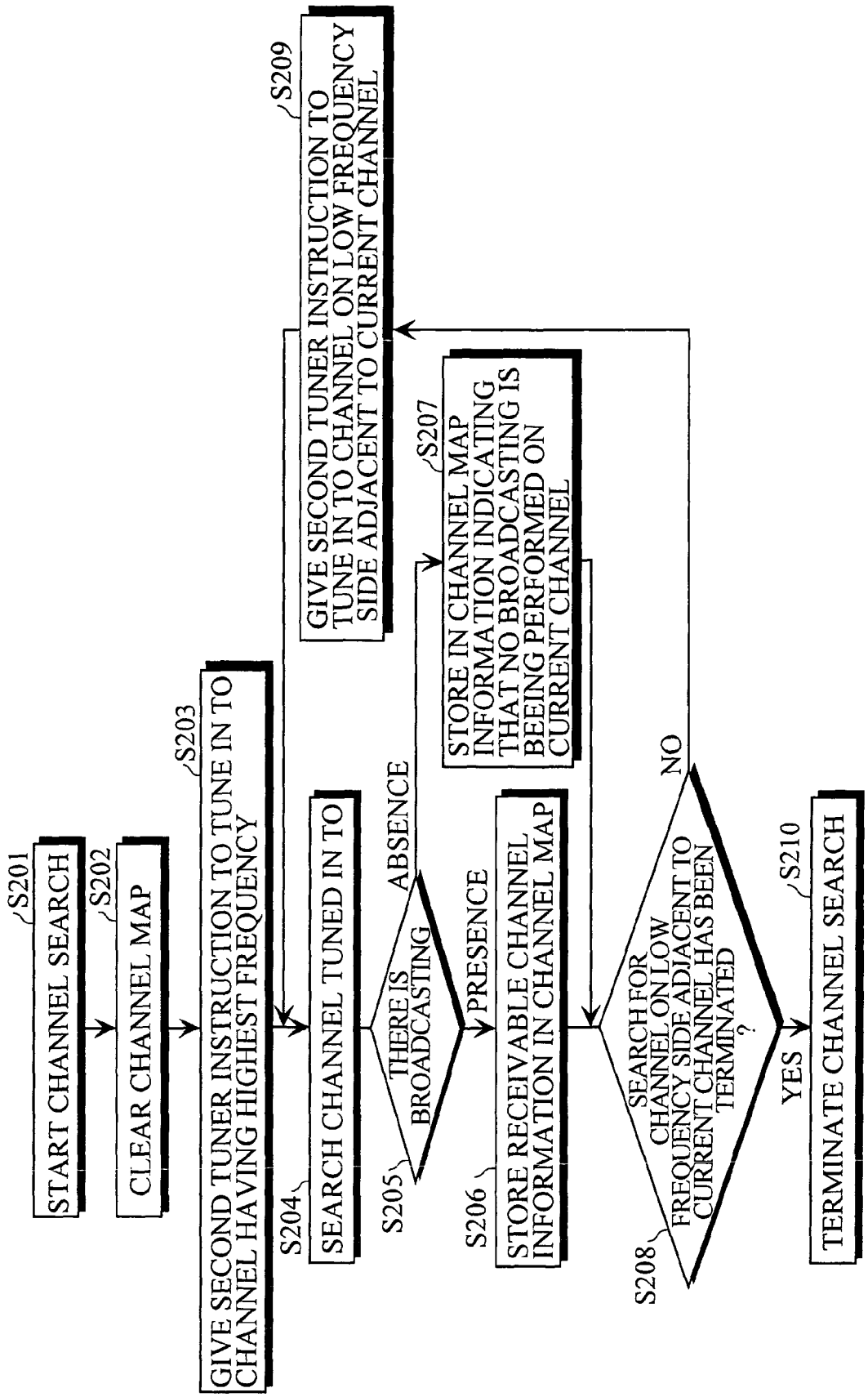
FIG. 3 is a flow chart showing the procedure for channel searching processing using a second digital receiving unit.

FIGS. 2 and 3 show the procedure for channel searching processing.

FIG. 2 shows the procedure for channel searching processing using a first digital receiving unit, and FIG. 3 shows the procedure for channel searching processing using a second digital receiving unit. Both the channel searches are simultaneously started.

First referring to FIG. 2, the channel searching processing using the first digital receiving unit will be described.

When a channel search is started (step S101), a microcomputer 300 clears the contents of a channel map stored in a memory 303 (step S102). Further, the microcomputer 300 gives a first digital tuner 101 an instruction to tune in to a receivable channel having the lowest frequency (a channel selection instruction) (step S103). As described later, it gives a second digital tuner 201 an instruction to tune in to a receivable channel having the highest frequency (a channel selection instruction).

The first digital tuner 101 selects a broadcasting signal corresponding to the channel which it is instructed to tune in to (step S104). The selected broadcasting signal is demodulated by a first digital demodulator 102, and is subjected to data separation processing by a first TS decoder 103. At this time, it is judged whether or not there is broadcasting depending on whether or not synchronization can be ensured and whether or not a broadcasting station can be recognized from output data from the TS decoder 103 by the status of the first digital demodulator 102 (step S105).

When it is judged in the foregoing step S105 that there is broadcasting (synchronization can be ensured and a broadcasting station can be recognized), receivable channel information indicating that the current channel is one on which digital broadcasting is performed, which broadcasting station is performing broadcasting, and what modulation system is used, for example, is stored in the channel map inside the memory 303 (step S106). The procedure then proceeds to the step S108.

When it is judged in the foregoing step S105 that there is no broadcasting (no synchronization can be ensured or no broadcasting station can be recognized), information indicating that no broadcasting is being performed on the channel currently tuned in to (information indicating that receiving is impossible) is stored in the channel map inside the memory 303 (step S107). The procedure then proceeds to the step S108.

In the step S108, the microcomputer 300 judges by referring to the channel map inside the memory 303 whether or not a search for a channel on the high frequency side adjacent to the current channel has already been terminated. That is, the microcomputer 300 judges that the search for the channel using the second digital receiving unit has already been terminated when receivable channel information or information indicating that no broadcasting is being performed is stored in the channel map with respect to the channel on the high frequency side adjacent to the current channel, while judging that the search for the channel using the second digital receiving unit has not been terminated when neither of the information is stored in the channel map.

When it is judged in the foregoing step S108 that the search for the channel on the high frequency side adjacent to the current channel is not terminated, an instruction to tune in to the channel on the high frequency side adjacent to the current channel is given to the first digital tuner 101 (step S109). The processing in the steps S104 to S108 is performed again.

When it is judged in the foregoing step S108 that the search for the channel on the high frequency side adjacent to the current channel has already been terminated, the channel search using the first digital receiving unit is terminated (step S110).

Referring now to FIG. 3, the channel searching processing using the second digital receiving unit will be described.

When a channel search is started (step S201), the microcomputer 300 clears the contents of the channel map stored in the memory 303 (step S202). Further, the microcomputer 300 gives the second digital tuner 201 an instruction to tune in to a receivable channel having the highest frequency (a channel selection instruction) (step S203).

The second digital tuner 201 selects a broadcasting signal corresponding to the channel which it is instructed to tune in to (step S204). The selected broadcasting signal is demodulated by a second digital demodulator 202, and is subjected to data separation processing by a second TS decoder 203. At this time, it is judged whether or not there is broadcasting depending on whether or not synchronization can be ensured and whether or not a broadcasting station can be recognized from output data from the TS decoder 203 by the status of the second digital demodulator 202 (step S205).

When it is judged in the foregoing step S205 that there is broadcasting (synchronization can be ensured and a broadcasting station can be recognized), receivable channel information indicating that the current channel is one on which digital broadcasting is performed, which broadcasting station is performing broadcasting, and what modulation system is used, for example, is stored in the channel map inside the memory 303 (step S206). The procedure then proceeds to the step S208.

When it is judged in the foregoing step S205 that there is no broadcasting (no synchronization can be ensured or no broadcasting station can be recognized), information indicating that no broadcasting is being performed on the channel currently tuned in to is stored in the channel map inside the memory 303 (step S207). The procedure then proceeds to the step S208.

In the step S208, the microcomputer 300 judges by referring to the channel map inside the memory 303 whether or not a search for a channel on the low frequency side adjacent to the current channel has already been terminated. That is, the microcomputer 300 judges that the search using the first digital receiving unit has already been terminated when receivable channel information or information indicating that no broadcasting is being performed is stored in the channel map with respect to the channel on the low frequency side adjacent to the current channel, while judging that the search using the first digital receiving unit has not been terminated when neither of the information is stored in the channel map.

When it is judged in the foregoing step S208 that the search for the channel on the low frequency side adjacent to the current channel is not terminated, an instruction to tune in to the channel on the low frequency side adjacent to the current channel is given to the second digital tuner 201 (step S209). The processing in the steps S204 to S208 is performed again.

When it is judged in the foregoing step S208 that the search for the channel on the low frequency side adjacent to the current channel has already been terminated, the channel search using the second digital receiving unit is terminated (step S210).

According to the above-mentioned embodiment, the channel search can be efficiently made in the broadcasting receiver comprising the two digital receiving units.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a broadcasting receiver comprising a broadcasting receiving unit for receiving a television broadcasting signal, and a memory for storing a channel map storing for each of broadcasting channels receivable channel information or information indicating that receiving is impossible, the broadcasting receiving unit comprising a first digital receiving unit and a second digital receiving unit, a broadcasting receiver comprising:

first channel searching means for tuning in to the broadcasting channels in a predetermined order using the first digital receiving unit, judging for each of the broadcasting channels whether or not broadcasting is receivable, and storing, with respect to the broadcasting channel on which broadcasting is receivable, the receivable channel information in the channel map, while storing, with respect to the broadcasting channel on which broadcasting is not receivable, the information indicating that receiving is impossible; and second channel searching means for tuning in to the broadcasting channels in an order opposite to the first channel searching means using the second digital receiving unit, judging for each of the broadcasting channels whether or not broadcasting is receivable, and storing, with respect to the broadcasting channel on which broadcasting is receivable, the receivable channel information in the channel map, while storing, with respect to the broadcasting channel on which broadcasting is not receivable, the information indicating that receiving is impossible, each of the channel searching means comprising means for judging, when a search for the subsequent channel is started, whether or not the receivable channel information or the information indicating that receiving is impossible is stored in the channel map with respect to the subsequent channel, means for starting the search for the subsequent channel when the receivable channel information or the information indicating that receiving is impossible is not stored in the channel map with respect to the subsequent channel, and means for terminating the channel search when the receivable channel information or the information indicating that receiving is impossible is stored in the channel map with respect to the subsequent channel.

2. The broadcasting receiver according to claim 1, wherein the first channel searching means searches for the channels in ascending order of their frequencies, and the second channel searching means searches for the channels in descending order of their frequencies.

3. The broadcasting receiver according to claim 1, wherein each of the digital receiving units comprises a digital tuner for selecting a channel to be received, and a digital demodulator for demodulating a signal on the selected channel, and each of the channel searching means judges whether or not digital broadcasting is receivable on the channel to be received currently selected depending on whether or not the digital demodulator can establish synchronization of a received signal.

4. In a channel searching method in a broadcasting receiver comprising a broadcasting receiving unit for receiving a television broadcasting signal, and a memory for storing a channel map storing for each of broadcasting channels receivable channel information or information indicating that receiving is impossible, the broadcasting receiving unit comprising a first digital receiving unit and a second digital receiving unit, a channel searching method in a broadcasting receiver comprising:

a first channel searching step for tuning in to the broadcasting channels in a predetermined order using the first digital receiving unit, judging for each of the broadcasting channels whether or not broadcasting is receivable, and storing, with respect to the broadcasting channel on which broadcasting is receivable, the receivable channel information in the channel map, while storing, with respect to the broadcasting channel on which broadcasting is not receivable, the information indicating that receiving is impossible; and second channel searching step for tuning in to the broadcasting channels in an order opposite to the first channel searching step using the second digital receiving unit, judging for each of the broadcasting channels whether or not broadcasting is receivable, and storing, with respect to the broadcasting channel on which broadcasting is receivable, the receivable channel information in the channel map, while storing, with respect to the broadcasting channel on which broadcasting is not receivable, the information indicating that receiving is impossible, each of the channel searching steps comprising the steps of judging, when a search for the subsequent channel is started, whether or not the receivable channel information or the information indicating that receiving is impossible is stored in the channel map with respect to the subsequent channel, starting the search for the subsequent channel when the receivable channel information or the information indicating that receiving is impossible is not stored in the channel map with respect to the subsequent channel, and terminating the channel search when the receivable channel information or the information indicating that receiving is impossible is stored in the channel map with respect to the subsequent channel.

5. The channel searching method according to claim 4, wherein the first channel searching step comprises the step of searching for the channels in ascending order of their frequencies, and the second channel searching step comprises the step of searching for the channels in descending order of their frequencies.

6. The channel searching method according to claim 4, wherein each of the digital receiving units comprises a digital tuner for selecting a channel to be received, and a digital demodulator for demodulating a signal on the selected channel, and each of the channel searching steps comprises the step of judging whether or not digital broadcasting is receivable on the channel to be received currently selected depending on whether or not the digital demodulator can establish synchronization of a received signal.

\* \* \* \* \*